(12) United States Patent
Miller et al.

(10) Patent No.: US 7,853,516 B2
(45) Date of Patent: Dec. 14, 2010

(54) METHOD OF ENERGY PROCUREMENT AND SYSTEM FOR EMPLOYING

(75) Inventors: Arthur Miller, Mars, PA (US); Mark Kleinginna, Canonsburg, PA (US); Jennifer Puskar, Pittsburgh, PA (US); Keith Giuliani, North Huntingdon, PA (US)

(73) Assignee: Direct Energy Business, LLC, Pittsburgh, PA (US)

( * ) Notice: Subject to any disclaimer, the term of this patent is extended or adjusted under 35 U.S.C. 154(b) by 0 days.

(21) Appl. No.: 12/130,640

(22) Filed: May 30, 2008

(65) Prior Publication Data
US 2009/0222371 A1 Sep. 3, 2009

Related U.S. Application Data

(60) Provisional application No. 61/033,194, filed on Mar. 3, 2008.

(51) Int. Cl.
*G06Q 40/00* (2006.01)
*G01R 11/56* (2006.01)
(52) U.S. Cl. ......................................... 705/37; 705/412
(58) Field of Classification Search .............. 705/35–42
See application file for complete search history.

(56) References Cited

U.S. PATENT DOCUMENTS

| | | | |
|---|---|---|---|
| 6,047,274 A | 4/2000 | Johnson et al. | |
| 6,151,589 A | 11/2000 | Aggarwal et al. | |
| 6,161,099 A | 12/2000 | Harrington et al. | |
| 6,167,386 A | 12/2000 | Brown | |
| 6,343,277 B1 * | 1/2002 | Gaus et al. | 705/37 |
| 6,415,270 B1 | 7/2002 | Rackson et al. | |
| 6,598,029 B1 * | 7/2003 | Johnson et al. | 705/37 |
| 6,681,156 B1 * | 1/2004 | Weiss | 700/291 |
| 6,785,592 B1 * | 8/2004 | Smith et al. | 700/291 |
| 6,847,939 B1 | 1/2005 | Shemesh | |
| 6,862,580 B1 * | 3/2005 | Ford | 705/37 |
| 7,085,739 B1 * | 8/2006 | Winter et al. | 705/37 |
| 7,139,733 B2 | 11/2006 | Cao et al. | |

(Continued)

OTHER PUBLICATIONS

Business/Technology Editors, "PSEG Energy Technologies and Enermetrix.com Announce Online Energy Procurement Service", Business Wire New York: Feb. 17, 2000. p. 1.*

(Continued)

*Primary Examiner*—Ella Colbert
*Assistant Examiner*—Mohammad Z Shaikh
(74) *Attorney, Agent, or Firm*—Eckert Seamens Cherin & Mellott, LLC; Stephen A. Bucchianeri, Esq.

(57) ABSTRACT

A method and system of procuring energy for a consumer from a number of wholesale parties is provided. The method includes preparing and conducting an event. Conducting the event including registering the number of wholesale parties, providing for the reception and recording of a number of offers from the number of wholesale parties, receiving a number of best offers from the number of wholesale parties, providing a first display of the number of best offers to the number of wholesale parties, providing a second display of the number of best offers to the customer, and determining a number of final winning offers from the number of best offers. The method concludes with securing energy for the customer according to the number of final winning offers.

15 Claims, 8 Drawing Sheets

U.S. PATENT DOCUMENTS

| | | | |
|---|---|---|---|
| 7,146,331 | B1 | 12/2006 | Young |
| 7,171,287 | B2 * | 1/2007 | Weiss .......................... 700/291 |
| 7,577,606 | B1 * | 8/2009 | Ford ............................ 705/37 |
| 2001/0032197 | A1 * | 10/2001 | Chandra et al. ............. 705/412 |
| 2002/0013763 | A1 | 1/2002 | Harris |
| 2002/0091626 | A1 * | 7/2002 | Johnson et al. .............. 705/37 |
| 2003/0014326 | A1 * | 1/2003 | Ben-Meir et al. ............ 705/26 |
| 2003/0023540 | A2 * | 1/2003 | Johnson et al. .............. 705/37 |
| 2003/0055664 | A1 | 3/2003 | Suri |
| 2003/0055776 | A1 * | 3/2003 | Samuelson ................... 705/37 |
| 2003/0216971 | A1 * | 11/2003 | Sick et al. ..................... 705/26 |
| 2004/0015428 | A2 * | 1/2004 | Johnson et al. .............. 705/37 |
| 2004/0015433 | A1 * | 1/2004 | Johnson et al. .............. 705/37 |
| 2004/0199423 | A1 | 10/2004 | LaBrosse et al. |
| 2005/0027636 | A1 * | 2/2005 | Gilbert et al. ................. 705/37 |
| 2005/0137956 | A1 * | 6/2005 | Flory et al. ................... 705/37 |
| 2005/0197950 | A1 | 9/2005 | Moya et al. |
| 2005/0234806 | A1 | 10/2005 | Findlay et al. |
| 2006/0085285 | A1 | 4/2006 | Cichanowicz |
| 2007/0179855 | A1 | 8/2007 | Rueda et al. |
| 2007/0179881 | A1 | 8/2007 | Lord |
| 2008/0010182 | A2 * | 1/2008 | Johnson et al. .............. 705/37 |
| 2009/0063369 | A1 * | 3/2009 | Brown et al. ................ 705/412 |
| 2009/0187501 | A1 * | 7/2009 | Winter et al. ................. 705/34 |

OTHER PUBLICATIONS

Anonymous, "Detroit Edison Completes Web-Based Energy Auction with World Energy; Auction results provide another example of World Energy's value to the wholesale market", PR Newswire. New York: Nov. 12, 2007.*

Fox, Jeanne M, "New Jerseys BGS Auction: A Model for the Nation", Public Utilities Fortnightly. Arlington: Sep. 2005, vol. 143, Iss. 9; p. 16, 3 pgs.*

Business Editors/Energy Editors, "Renowned NERA Auctions Expert Dr. David Salant to Discuss Role of Auctions in Wholesale Electricity Markets", Busines Wire. New York: Nov. 21, 2002. p. 1.*

"Utilyx: Boots gives energy costs the Utilyx treatement; New system for managing price risk combines benefits of three-year service contract with energy buying timed to take advantage of wholesale market dips", M2 Presswire. Coventry: Jun. 21 ,2004. p. 1.*

"E-procurement and energy: with competition stiffer than ever before, the strategic use of e-technology is the most successful way of procuring energy. (Power Podium)", Power Economics, v 6, n 10, p. 12.*

"State of Conneticut Completes Renewable Energy Auction with World Energy", Canada NewsWire. Ottawa: Oct. 18, 2007. p. 1.*

* cited by examiner

METHOD OF ENERGY PROCUREMENT AND SYSTEM FOR EMPLOYING

CROSS REFERENCE TO RELATED APPLICATION

This patent application claims the benefit of U.S. Provisional Patent Application Ser. No. 61/033,194 filed Mar. 3, 2008, the contents of which are hereby incorporated by reference into this patent application in its entirety as if fully set forth herein.

BACKGROUND OF THE INVENTION

1. Field of the Invention

The invention relates generally to a system and method of procuring energy and energy related products and services (hereinafter "energy") for a consumer. More particularly, the invention relates to a system and method for procuring electrical power for a retail customer from one or more wholesale parties.

2. Background Information

The electric power and natural gas industries have experienced fundamental changes resulting from deregulation. One result of deregulation has been to give end users a choice of energy providers. Until recently, substantially all end users purchased the electric power or natural gas they needed from the local electric or gas utility serving their geographic area. Electric utilities have generally operated as vertically integrated local monopolies, producing or purchasing (on a wholesale basis), the quantities of electric power they needed to serve all end users within the utility's geographic boundaries. Natural gas utilities have generally operated in a similar fashion, though usually purchasing rather than producing most of the natural gas they need.

One of the primary objectives of deregulation has been to reduce energy costs for end users by fostering competition among energy providers. However, present means through which end users may procure energy from energy producers has many drawbacks which tend to lead to less than optimum pricing for the end user. One such approach, a fixed retail price reverse auction, occurs at the retail level and only contemplates a fixed price for a customer's full requirements. Another approach, an opaque offer process conducted with wholesale counterparties by the retail electricity provider, can be for less than full requirements but is not completely transparent to the retail customer.

As such, there is room for improvement to existing methods of energy procurement. The present invention provides for an improved method of energy procurement and system for employing.

SUMMARY OF THE INVENTION

These needs and others are met by embodiments of the invention, which are directed toward a system and method of procuring energy for a consumer from a number of wholesale parties.

In accordance with one aspect of the invention, a method of procuring energy for a consumer from a number of wholesale parties is provided. The method comprises preparing an event and conducting the event. Conducting the event comprises: registering the number of wholesale parties; providing for the reception and recording of a number of offers from the number of wholesale parties; receiving a number of best offers from the number of wholesale parties; providing a first display of the number of best offers to the number of wholesale parties; providing a second display of the number of best offers to the customer; and determining a number of final winning offers from the number of best offers. The method concludes by securing energy for the customer according to the number of final winning offers.

Preparing an event may comprise: receiving a number of energy requirements from the consumer; providing the number of energy requirements to the number of wholesale parties; and providing the number of wholesale parties and the consumer with information pertaining to the event.

The method may further comprise prior to conducting the event, requiring the customer to indicate acceptance of the energy requirements.

Registering the number of wholesale parties may comprise receiving a username and password from each of the wholesale parties. The number of wholesale parties may comprise at least two wholesale parties.

Setting up an event may comprise determining a time, a location, and duration for the event.

The first display may comprise a current winning (lowest) offer. The second display may comprise a current winning offer and an indication of a maker of the winning offer. The indication may comprise an indicator distinguishing the maker of the winning offer from other offerors.

Each of the number of offers may comprise a price; wherein the price is associated with a number of qualifications, the qualifications comprising a term and an indication of whether the offer is for a peak or an off peak time period.

The number of energy requirements may includes at least one member from the group consisting of: type of energy; a term; a quantity; a point of delivery; an activity time; and an activity duration.

The information pertaining to an event may comprise the time and location of the event; a duration of the event; and information needed to gain access to the event.

The method may further comprise providing to the consumer and number of wholesale parties a result listing.

In accordance with another aspect of the invention, a system for procuring energy for a consumer from a number of wholesale parties employing the method described above is provided.

BRIEF DESCRIPTION OF THE DRAWINGS

A full understanding of the invention can be gained from the following description of the preferred embodiments when read in conjunction with the accompanying drawings in which:

FIGS. 3-6 show the views of wholesaler counterparties in accordance with an embodiment of the invention.

Figure 1A:
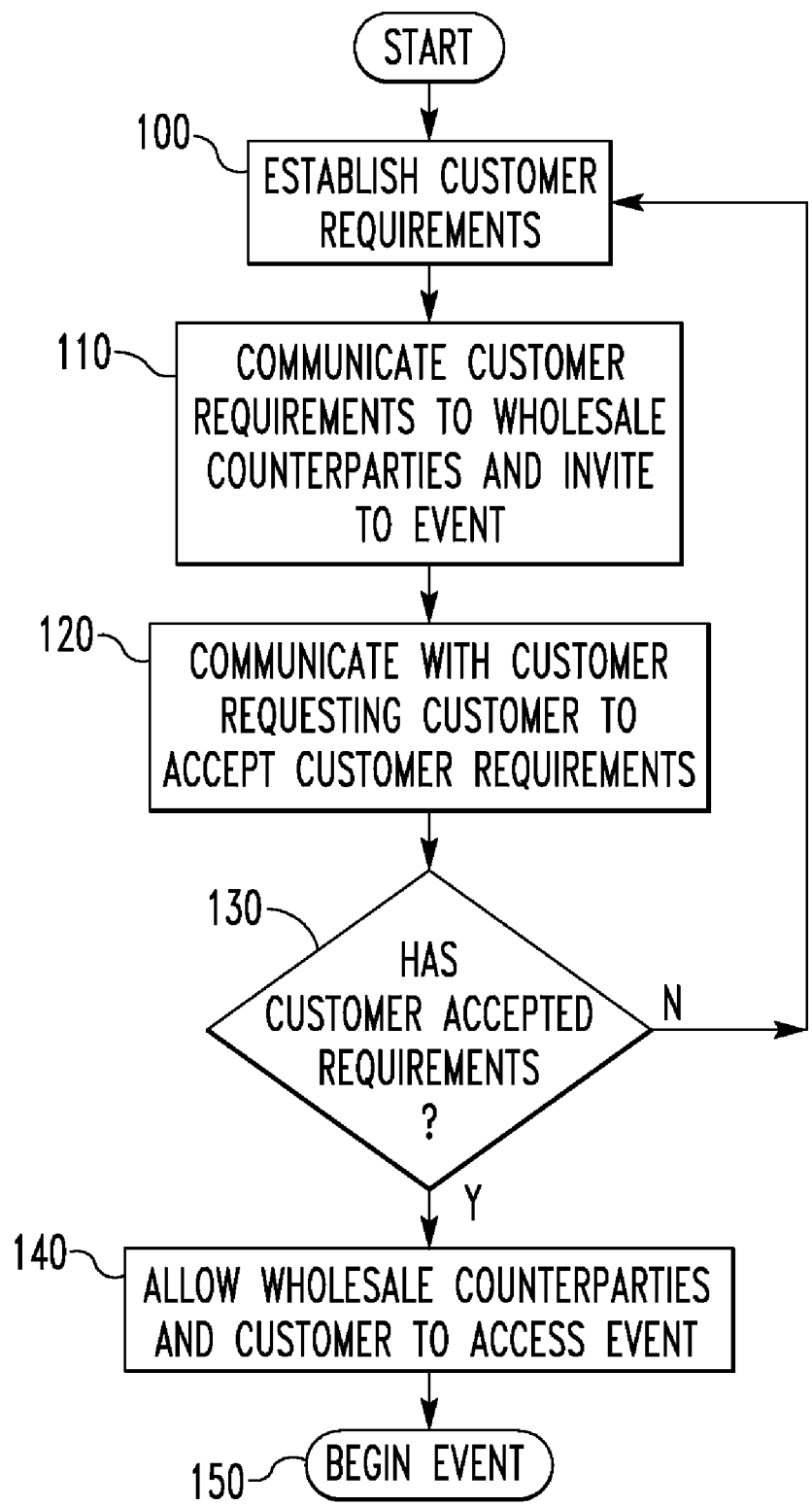
FIGS. 1A-1C show a flowchart of a method in accordance with embodiments of the invention.
Figure 1B:
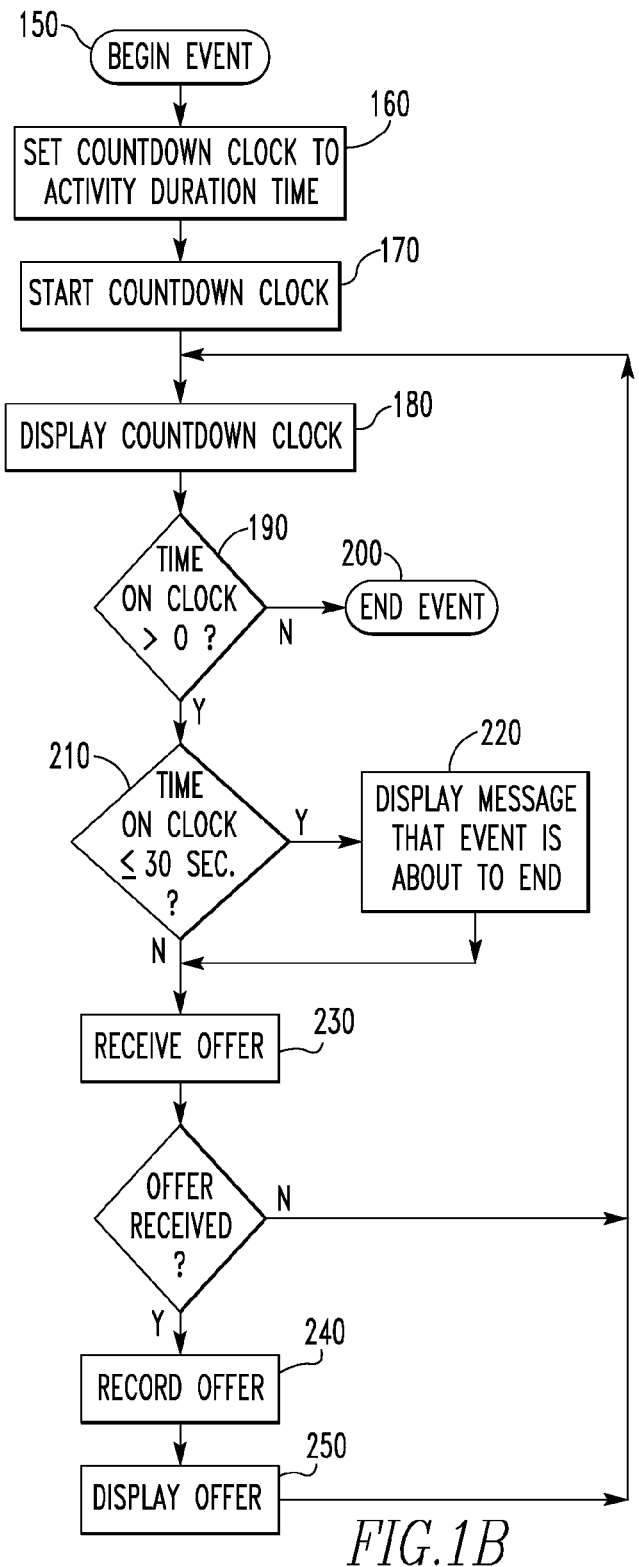
Figure 1C:
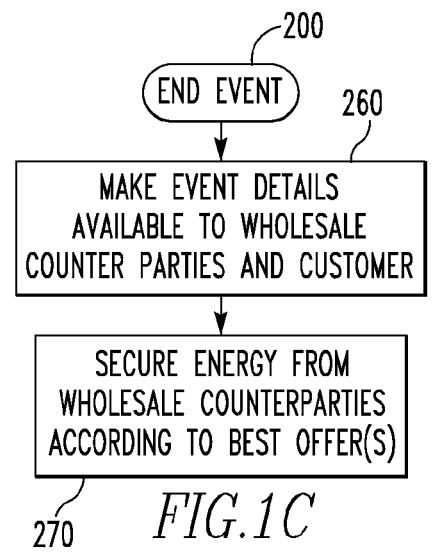

It is to be appreciated that the figures described above are provided to increase understanding of the present invention and are not meant to limit the invention as alternate steps may be substituted and other steps may be added or removed.

DESCRIPTION OF THE PREFERRED EMBODIMENTS

As used herein, a "wholesale counterparty" is an entity that buys and sells energy and energy-related products and services in the wholesale energy marketplace.

As used herein, a "customer" is a purchaser of retail energy and energy-related products and services.

As used herein, a "host" is the administrator of each and every event.

As used herein, "customer requirements" are the commercial terms surrounding an event and may include, without limitation, type of energy, a date, activity duration of the event, terms, delivery point, a maximum opening price, a requisite number of wholesale counterparties in attendance, received offers from a requisite number of independent wholesale counterparties, and/or any other special considerations.

As used herein, an "event" is an occurrence initiated by a host and a customer with the participation by one or more wholesale counterparties aimed at achieving the customer requirements.

As used herein, a "term" is the start and end date for the delivery of a quantity of energy and energy-related products and services.

As used herein, a "quantity" is the measure of an amount of energy and energy-related products and services (e.g., without limitation, an amount expressed in kilowatt hours or megawatt hours).

As used herein, an "activity time" is the scheduled start time for a particular event.

As used herein, an "activity duration" is the period of time from the start of activity through the scheduled conclusion of an event.

As used herein, a "maximum opening price" is a predetermined price by which any offer submitted by a wholesale counterparty may not exceed.

As used herein, an "offer" is the price submitted by the wholesale counterparties.

As used herein, a "best offer" is the current winning offer during an event.

As used herein, a "winning offer" is the best offer at the conclusoin of the event.

As used herein, "on peak" refers to a period of maximal use of energy and energy-related products and services or demand or activity.

As used herein, "off peak" refers to a period of less than maximal use of energy and energy-related products and services or demand or activity.

As used herein, the term "number" shall mean one or an integer greater than one (i.e., a plurality).

The present invention as described herein and shown in the accompanying figures is directed toward a method and system for the procuring of energy and energy related products and services (hereinafter referred to as "energy") for a customer by a host in which the hosts facilitates price offers from wholesale counterparties. The method described herein may be carried out via an online session in which the customer(s) and wholesale counterparties may access through a log-in process or similar means and interact with the host. However, it is to be appreciated that the present invention may also be readily carried out through other means (e.g., without limitation, through a phone conference session, in-person meeting place, or any combination thereof).

Referring to FIG. 1a, prior to scheduling and hosting an event, energy requirements of the customer (customer requirements) are defined and established, as shown at 100, by the host and the customer. It is foreseen that this may be accomplished via phone discussion, in-person talks, email communication, or through other communication. Such customer requirements may include, without limitation, type of energy (e.g., without limitation, electricity, gas), term start, term end, delivery zone and an energy load required (e.g., without limitation, electricity load (Megawatt hour)). There may be multiple terms (e.g., without limitation, 1, 3 or 6 months) typically starting on the first of the month and ending on the last day of a month. Customer requirements may also include, without limitation, a maximum opening price, a required number of wholesale counterparties participating in the event, and a required number of wholesale counterparties actually making offers during the event. It is to be appreciated that customer requirements may vary greatly and can be tailored to meet the particular needs of a specific customer without varying from the objectives of the present invention. Accordingly, the accompanying flow chart shown in the Figures presents merely one embodiment of the present invention and may be varied to show the different conditions (or multiple conditions) that may be placed on the holding of the event.

Once the customer requirements are established at 100, they are communicated (e.g., without limitation, via email, mail, fax, phone), as shown at 110, to potential wholesale counterparties along with information about, and an invite to participate in, the event. The information about the event may include the time (activity time), duration (activity duration), and location of the event. In a preferred embodiment of the invention in which the event is hosted on the internet, the location may be an internet address, in which case the invitation may also contain a login identification and password or may utilize a pre-existing account name and password. In other embodiments, the location may be a phone number to dial into the event or the location where an event may be attended by one or more participants in person.

Customers may choose to participate in the event hosted by the host or they may choose to have the event held without their attendance. Customers may also invite other parties to view the event. Customers and their invited guests generally may participate in the event in a "view only" mode, discussed below in greater detail, in which they may not actually actively participate or alter or change any information pertaining to the event. In a preferred embodiment, customers are required to formally indicate acceptance of the customer requirements prior to commencement of the event, as shown at 120 and 130 of the embodiment of FIG. 1a. In such a preferred embodiment, such acceptance may be carried out by the customer logging in and indicating acceptance of the customer requirements such as through clicking a checkbox or other similar means (e.g., without limitation, placing an electronic signature, clicking an acceptance button). In such an embodiment, if the customer fails to accept or refuses to accept the customer requirements the event may be cancelled or postponed pending acceptance of revised customer requirements.

As shown at 140, once the customer has accepted the customer requirements the wholesale counterparties and customer and/or invitees of the customer may gain access to the event as previously discussed. A minimum number of wholesale counterparties participating in the event may be required by the customer by means of the customer requirements before an event may begin. Similarly, a customer may specify a required number of wholesale counterparties to have participated during the event for the event to be considered valid. It is foreseeable that such participation in an event may be defined by as submitting an offer, submitting a best (or winning) offer, or merely viewing the event (it is foreseeable that a wholesale counterparty may not be in a position during the course of an event to actually make an offer of low enough amount to qualify as a best offer and therefore not actually submit any offer).

FIGS. 2-6 show example displays that may be provided to attendees of an event held via the internet in accordance with an embodiment of the present concept. Such displays would be made available to the respective attendees after initially gaining access to the event. Each of the attendee views includes a header portion 6 that includes a greeting portion 8 providing a confirmation greeting of the attendee viewing the event. For example, in the example customer view shown in FIG. 2, the greeting portion 8 contains the greeting "Hello, Customer 1 (customer a)." Similarly, in the Wholesaler view shown in FIG. 3, the greeting portion 8 contains the greeting "Hello, Wholesaler 1 (supply compan)." It is to be appreciated that such messages are given for example purposes only and may be varied or eliminated for specific applications.

An example event will now be described in conjunction with the flow chart of FIGS. 1a-1d and the attendee views/displays of FIGS. 2-6. Upon commencement of an event, as shown at 150, a countdown clock 10, provided in the header portion 6 of the attendee displays, may be used to indicate time remaining in the event. As shown at 160, the countdown clock is initially set to the activity duration time as decided upon in the customer requirements and begins counting down, as shown at 170, toward zero upon commencement of the event. It is to be appreciated that the length of an event can be flexible but is preferably of rather short duration (e.g., without limitation, one hour). As indicated at 180, the countdown clock 10 will appear to all participants and viewers counting down from the initial predetermined activity duration time. If it is determined at 190 that there is no time remaining on the countdown clock 10, the event will be completed as shown at 200. In a preferred embodiment, when there is 30 seconds or less time remaining on the countdown clock 10, flashing text will appear alerting participants that the event is about to close as shown at 210 and 220. It is to be appreciated that such flashing text may be in addition to the countdown clock 10 or may comprise flashing or other visual changes (e.g., without limitation, color, size, flashing display) to the countdown clock 10. In some embodiments, the event duration may be extended. Such extension of time may be predicated upon an offer being received during a certain time period near the event ending or by other factors at the discretion of the host. The host may reserve the right to extend the event.

Figure 3:
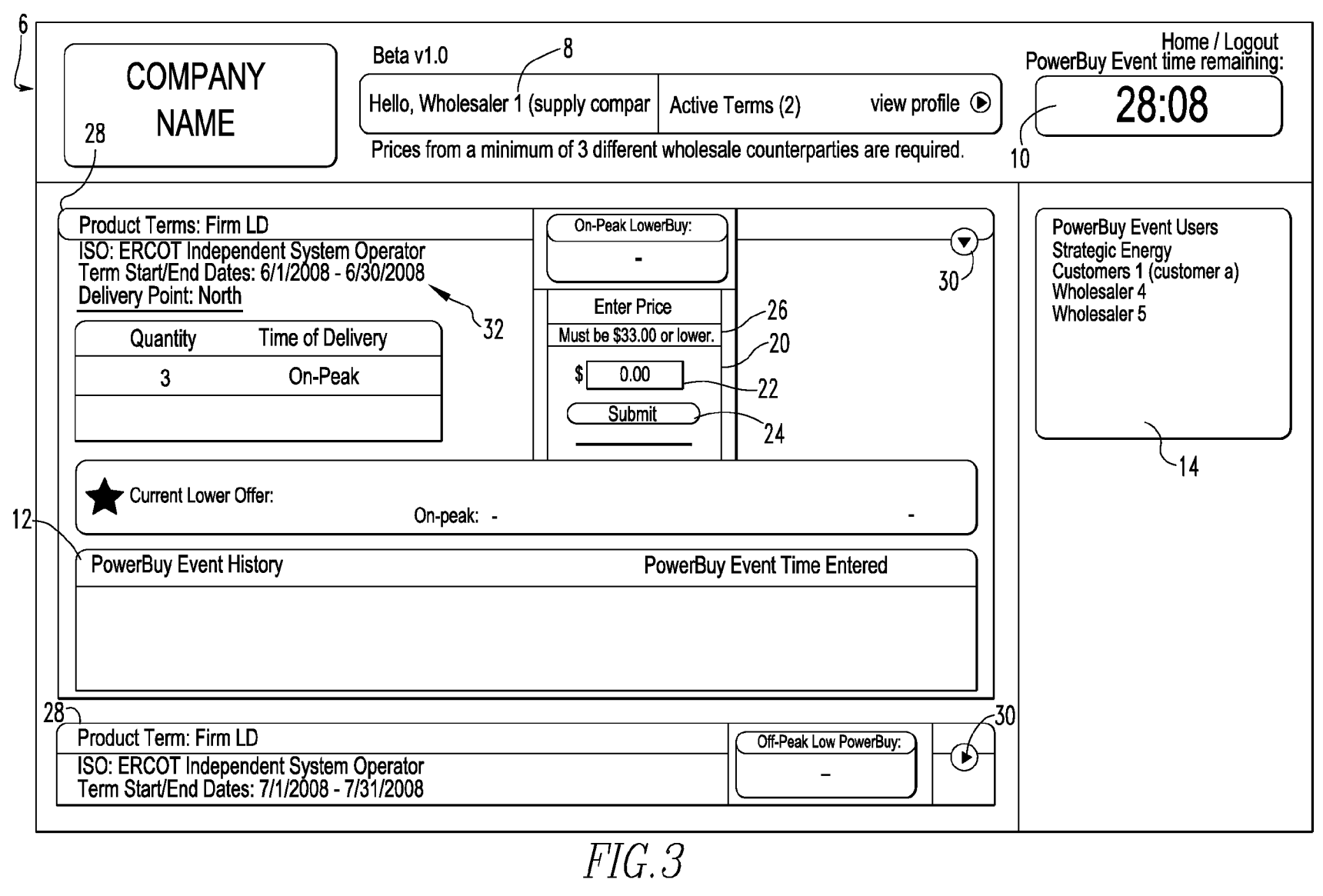

Attendees of the event, including wholesaler counterparties and customers and/or their invitees may be displayed in a user section 14 of the attendee views. During an event, energy wholesale counterparties will submit offer prices on specific customer load and term requirements. In the example shown in FIGS. 2-6, such an offer may be submitted through an offer submission window 20. As shown in FIG. 3, an example offer submission window may contain an input window 22 through which an offer price may be submitted, preferably through the use of a submit button 24 or similar means. In the example shown, the offer window 20 may also contain offer requirements 26, such as a maximum allowable offer amount, to aid the wholesale counterparties in the offering process. As shown in FIGS. 2-6, the attendee view may contain separate term windows 28. Such term windows may be collapsible and expandable through selection of an icon 30. Each term window 28 may contain term details 32 pertaining to the particular term (e.g., without limitation, start/end dates, delivery point).

A host or hosts will mediate the event, and receive offers from the wholesale counterparties as shown as 230. Upon receiving an offer at 230, the details (i.e., name of counterparty, amount, term) of the offer will be recorded, as shown at 240. Pricing offers made by the wholesale counterparties may be limited to set increments. In a preferred embodiment such increments are set at 5 cents. Pricing offers may also be limited by the customer requirements, as the customer requirements may dictate a "maximum opening price" indicative of the maximum offer price that may be submitted or be allowed during the event. If no offers are submitted at or below such a maximum opening price the event may be held to be invalid and any results voided. As shown at 250, during the event, offers submitted may be displayed to the wholesale counterparties as well as the customer and any invitees of the customer such as shown in the history portion 12 of the views shown in FIGS. 2-6. In a preferred embodiment, an indicator 16 is provided to identify the present lowest (winning) offer.

Figure 1D:
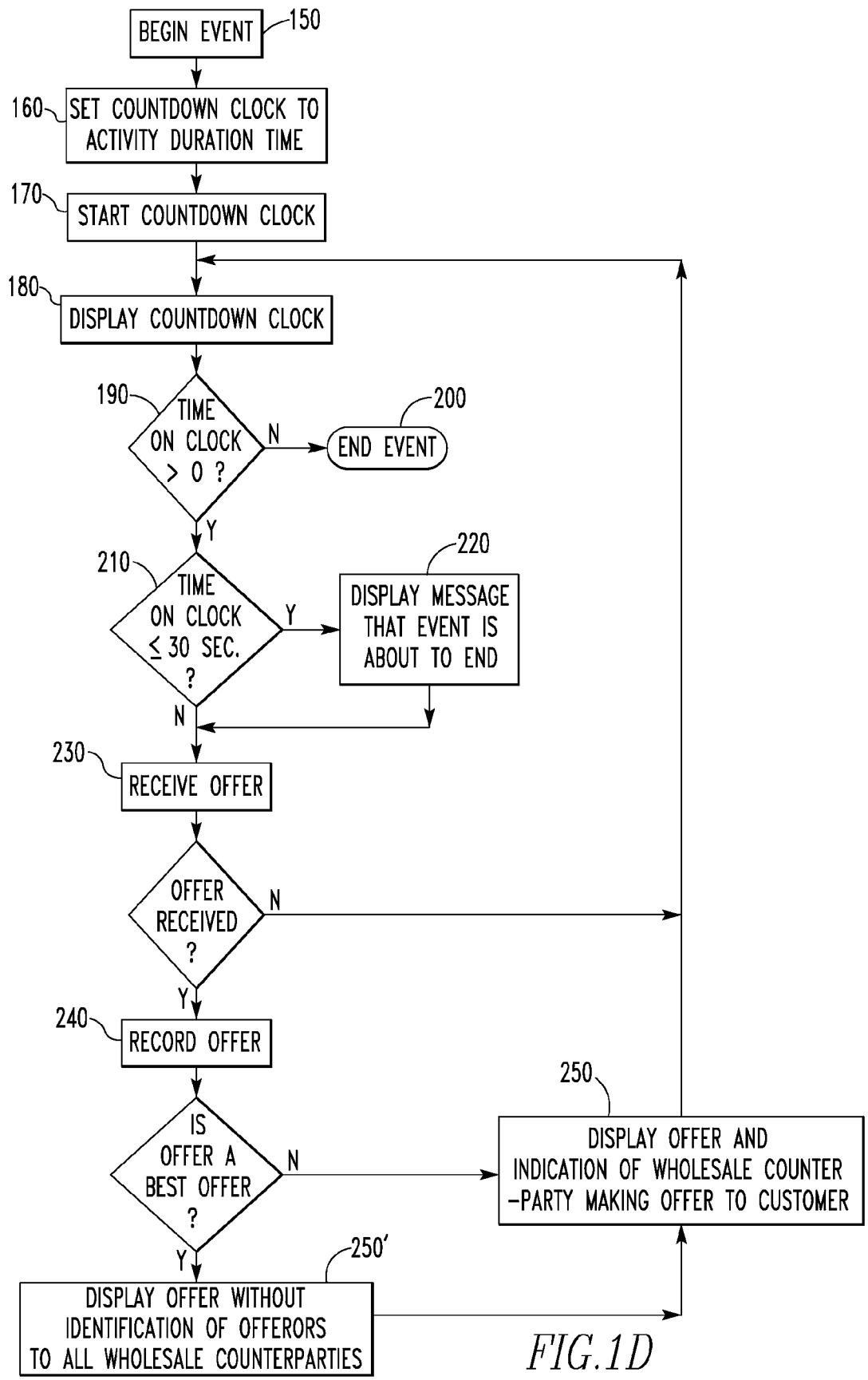
FIG. 1D shows alternate steps in accordance with another embodiment of the invention.
Figure 2:
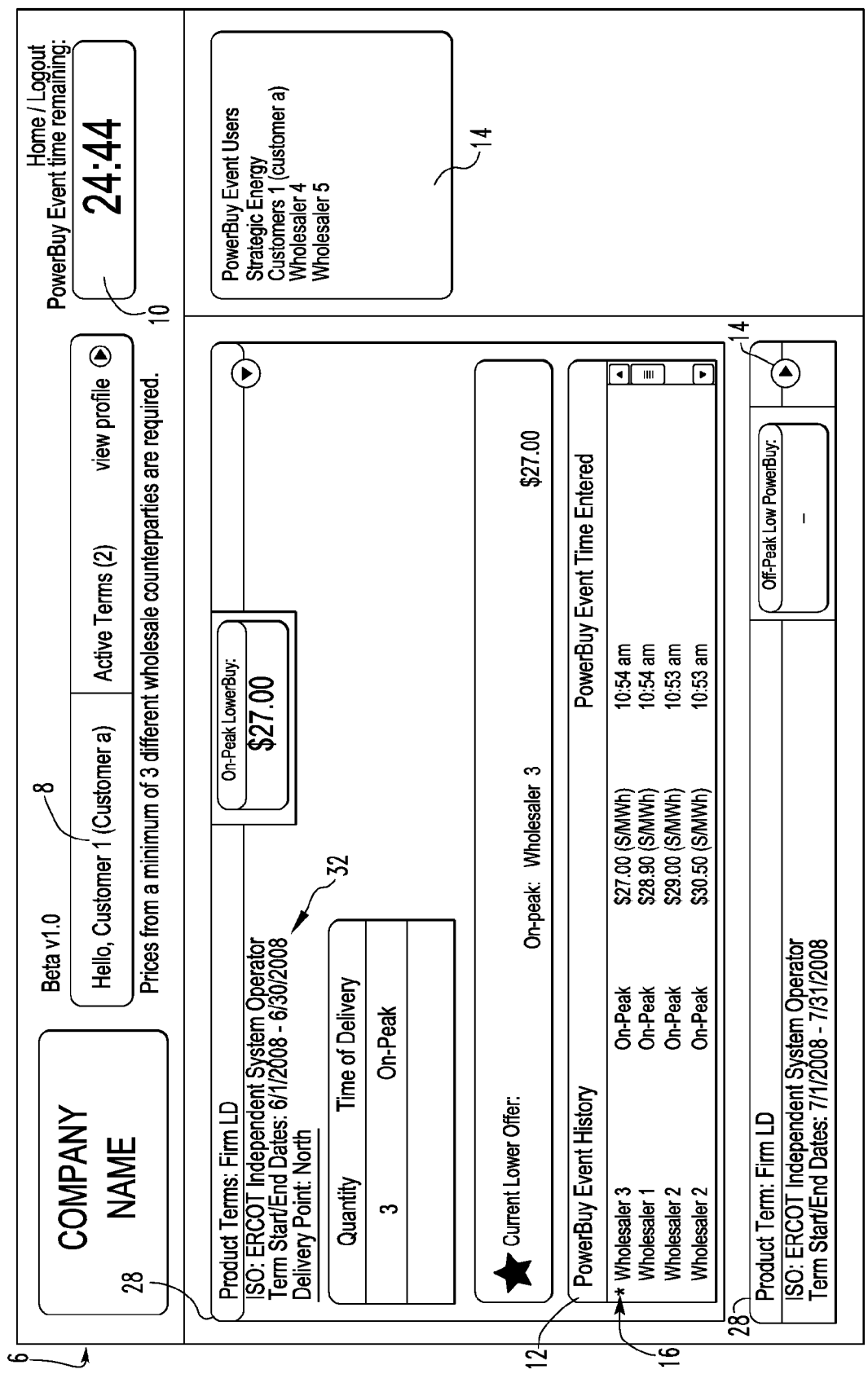
FIG. 2 shows a customer view in accordance with an embodiment of the invention.

In a preferred embodiment such as shown at 250' and 255' of FIG. 1D, wholesale counterparties will only be able to view the pending best offers submitted by any of the participating wholesale counterparties. However, preferably, wholesale counterparties will be limited to viewing only anonymous price offerings without indication of the wholesaler effectuating the particular price offering. Customers may, preferably as shown at 255', view all of the offers submitted along with an indication of the wholesale counterparty that made the offer, as shown in the history portion 12 of FIG. 2. In a preferred embodiment, such indication may indicate the particular wholesale counterparty by a designation such as "Wholesaler A" or "Wholesaler B" or equivalent. Thus, the indication may serve to distinguish among the wholesale counterparties participating in the event without actually identifying the name or other identification of the participating wholesale counterparty. Customers may also be provided with a listing of all offers made by each of the wholesale counterparties. Each of the wholesale counterparties may be provided with a record of their complete offer history, such as shown in the history portion 12 of FIG. 5. Providing such information allows the customer to readily identify if a single wholesale counterparty has posted the winning offer for multiple terms or if multiple wholesale counterparties have posted winning offers for different terms. Preferably, the history portion 12 of the customer view will include all prices (on and off peak) and the time the price offer was entered for each wholesaler counterparty. As the goal of the customer is to get the energy desired for the lowest price, prices will be displayed in descending order with lowest price first (with the lowest price being the current winning offer).

Preferably, the price offerings submitted by the wholesale counterparties and received at 230 will be for each term separately and will be made separately for on or off peak for each term. For example, Wholesaler A could have the best price for Term 1 (e.g., January 2008), but Wholesaler B could have the best price for Term 2 (e.g., February 2008-March 2008).

Figure 4:
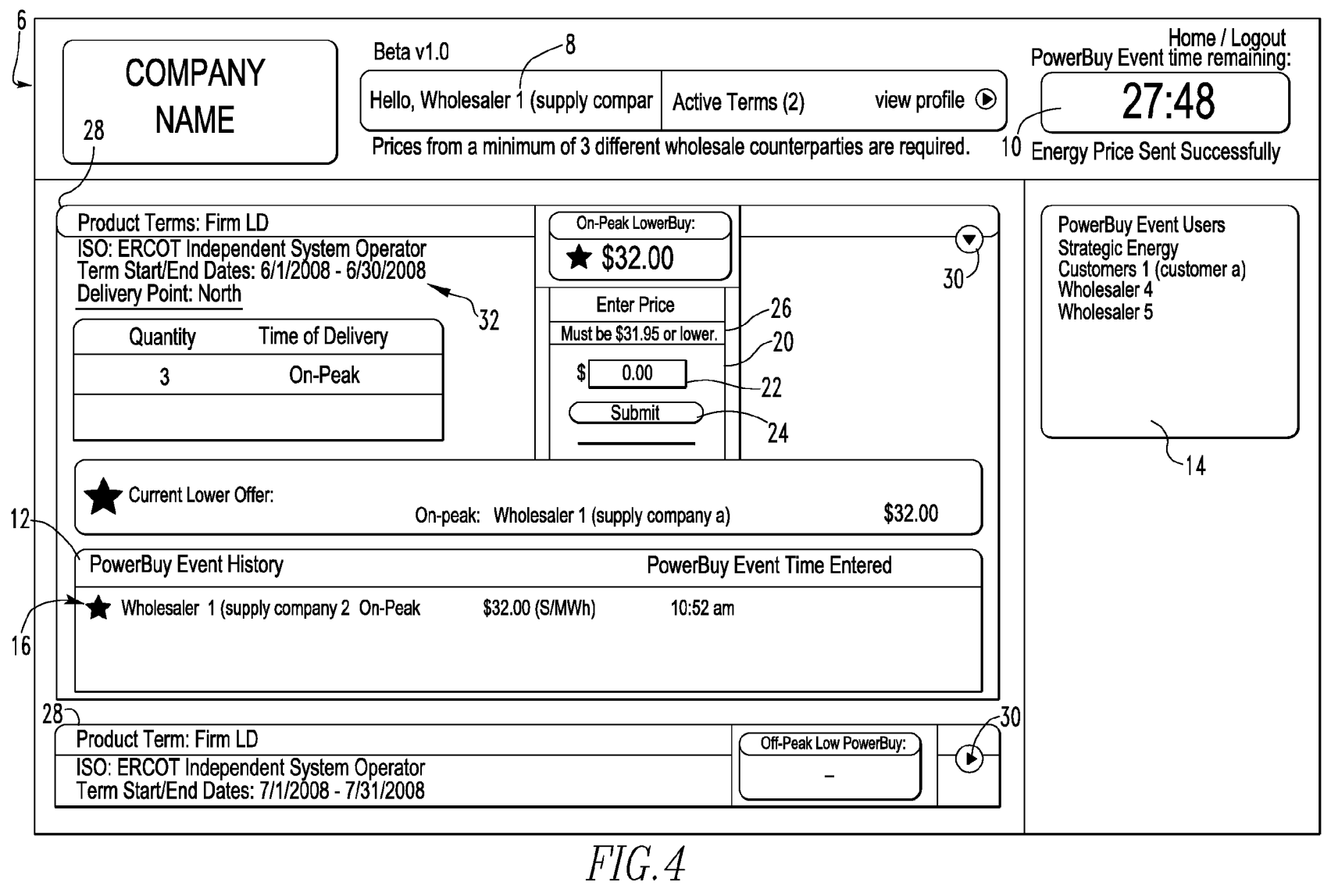
Figure 5:
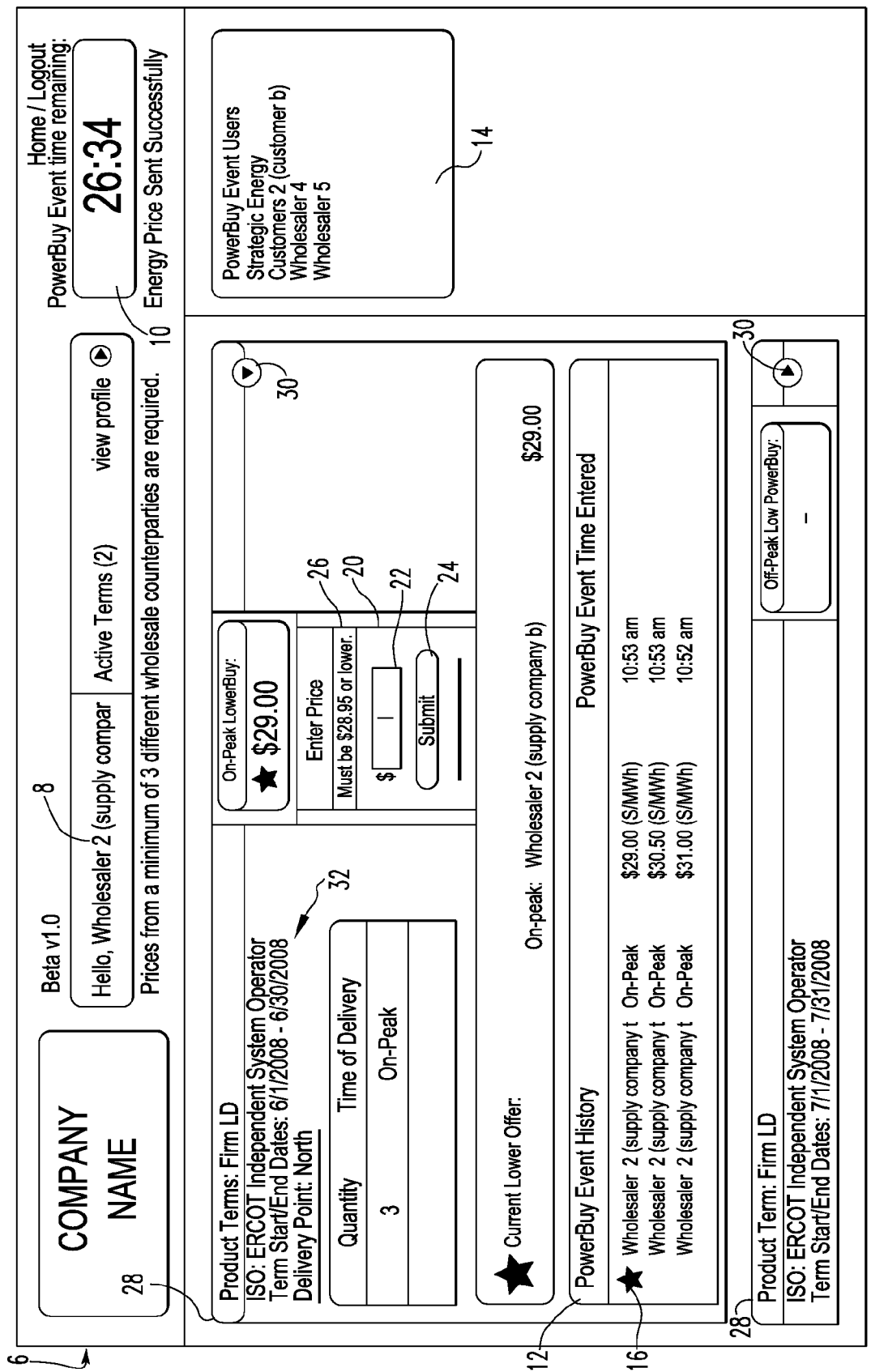
Figure 6:
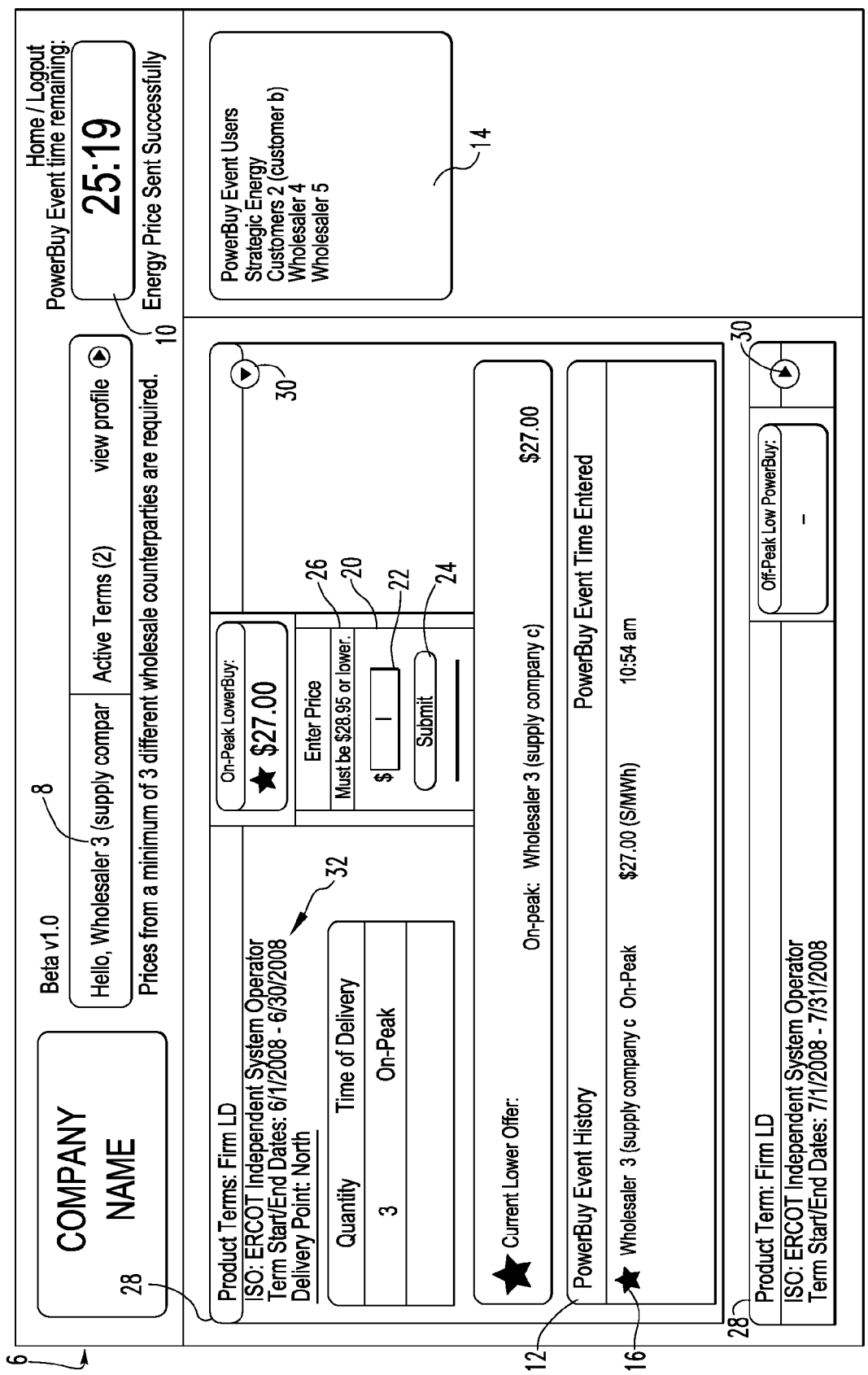

Each wholesale counterparty will also be able to view their individual price offer history as shown in the history portion 12 of FIGS. 4-6. This history may be provided in a list or a chart detailing the timeline of price offerings. It is to be appreciated that the price offerings shown to various participants and/or viewers of the event may be varied in different embodiments of the present invention.

Upon conclusion of the event, as shown at 200 (such as when the countdown clock reaches zero), winning offers for each separate term are determined from any best offers existing at the time of the ending of the event. Such winning offers for each term will be accepted by the host at the discretion of the host. Based upon the winning offers, the host will procure energy for ultimate consumption by the customer in accordance with the terms of the winning offer(s), as shown at 270.

As shown at 260, archived pricing and other event details may be made available to the customer and wholesale counterparties after the event has closed for future reporting or reference. A recordation (e.g., without limitation, a PDF file) of event details such as archived pricing may be sent to all participants after conclusion of the event or could be provided in an account history or by similar means.

Through use of the system and method described herein in procuring energy, the customer will have transparency into the wholesale market and will no longer rely on the retailer for transparency.

Customers dealing with the method, may have the ability to take advantage of non-standard product offerings and may not be required to make a full requirement purchases under a single event. Instead, the customer may take advantage of multiple, separate events over a period of time to help achieve an optimum lowest aggregate target price.

While embodiments of the invention have been described in varying detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

While not described in specific detail herein, it is to be appreciated that the method of the present invention may be employed through various electronic communication means or combinations thereof (e.g., computer networks, the internet, other wired and/or wireless communications means, etc.).

What is claimed is:

1. A method of procuring energy for a consumer by a host from a number of wholesale parties, the method comprising:
   preparing an event;
   conducting the event by the host via a computer, said conducting comprising:
   registering the number of wholesale parties;
   providing for the reception and recording of a number of offers from the number of wholesale parties;
   receiving a number of best offers from the number of wholesale parties; providing a first display of the number of best offers to the number of wholesale parties;
   providing a second display of the number of best offers to the consumer; and
   determining a number of final winning offers from the number of best offers; and
   securing energy by the host for future consumption by the consumer according to the number of final winning offers.

2. The method of claim 1, wherein preparing an event comprises: receiving a number of energy requirements from the consumer; providing the number of energy requirements to the number of wholesale parties; and
   providing the number of wholesale parties and the consumer with information pertaining to the event.

3. The method of claim 2, further comprising prior to conducting the event, requiring the consumer to indicate acceptance of the energy requirements.

4. The method of claim 1, wherein registering the number of wholesale parties comprises receiving a username and password from each of the number of wholesale parties.

5. The method of claim 1, wherein the number of wholesale parties comprises at least two wholesale parties.

6. The method of claim 1, wherein setting up an event comprises determining a time, a location, and duration for the event.

7. The method of claim 1, wherein the first display comprises a current winning (lowest) offer.

8. The method of claim 1, wherein the second display comprises a current winning offer and an indication of a maker of the winning offer.

9. The method of claim 8, wherein the indication comprises an indicator distinguishing the maker of the winning offer from other offerors.

10. The method of claim 1, wherein each of the number of offers comprise a price; wherein the price is associated with a number of qualifications, the qualifications comprising a term and an indication of whether the offer is for a peak or an off peak time period.

11. The method of claim 1, wherein the number of energy requirements includes at least one member from the group consisting of: type of energy; a term; a quantity; a point of delivery; an activity time; and an activity duration.

12. The method of claim 2, wherein the information pertaining to an event comprises the time and location of the event; a duration of the event; and information needed to gain access to the event.

13. The method of claim 1, further comprising providing to the consumer and number of wholesale parties a result listing.

14. A method of procuring energy by a host from a number of whole sale parties for future consumption by a consumer the method comprising:
   preparing an event;
   conducting the event by the host via a computer, said conducting comprising:
   registering the number of wholesale parties;
   displaying an event clock to the number of wholesale counterparties, the event clock indicating the time remaining in the event;
   starting the event clock counting down from a predetermined event duration time;
   providing for the reception and recording of a number of offers from the number of wholesale parties;
   receiving a number of best offers from the number of wholesale parties; providing a first display of the number of best offers to the number of wholesale parties;
   providing a second display of the number of best offers to the consumer; determining that the remaining time on the event clock is less than or equal to a warning time and responsive thereto, providing an indication to the number of wholesale parties that the event is about to end;
   determining via the computer that no time is left on the event clock and responsive thereto, concluding the event; and
   determining via the computer a number of final winning offers from the number of best offers; and securing energy by the host for future consumption by the consumer according to the number of final winning offers.

15. The method of claim 14, further comprising: receiving a best offer after determining that the remaining time on the event clock is less than or equal to a warning time and, responsive thereto, extending the event.

* * * * *